United States Patent [19]

Kurakake

[11] Patent Number: 4,816,728
[45] Date of Patent: Mar. 28, 1989

[54] PHOTOELECTRIC MOTION LIMITING CONTROL APPARATUS FOR A ROBOT MECHANISM

[75] Inventor: Mitsuo Kurakake, Hino, Japan
[73] Assignee: Fanuc Ltd, Minamitsuru, Japan
[21] Appl. No.: 923,150
[22] PCT Filed: Apr. 15, 1986
[86] PCT No.: PCT/JP86/00188
§ 371 Date: Oct. 6, 1986
§ 102(e) Date: Oct. 6, 1986
[87] PCT Pub. No.: WO86/06313
PCT Pub. Date: Nov. 6, 1986

[30] Foreign Application Priority Data

Apr. 24, 1985 [JP] Japan .................. 60-88227

[51] Int. Cl.⁴ .............................. B25J 19/06
[52] U.S. Cl. .................... 318/568; 318/480; 901/47
[58] Field of Search .......... 318/480, 568, 568 G, 318/568 I; 901/2, 13, 46, 47, 49, 50

[56] References Cited

U.S. PATENT DOCUMENTS

| | | | |
|---|---|---|---|
| 3,888,362 | 6/1975 | Fletcher et al. | 318/640 X |
| 4,295,740 | 10/1981 | Sturges | 901/46 X |
| 4,420,253 | 12/1983 | Pryor | 901/47 X |
| 4,453,085 | 6/1984 | Pryor | 901/47 X |
| 4,481,592 | 11/1984 | Jacobs et al. | 901/47 X |
| 4,501,961 | 2/1985 | Stauffer | 901/47 X |
| 4,570,065 | 2/1986 | Pryor | 901/47 X |
| 4,626,999 | 12/1986 | Bannister | 901/47 X |
| 4,633,079 | 12/1986 | Rieger | 901/47 X |

FOREIGN PATENT DOCUMENTS 55-64971  5/1980  Japan .
59-166497  9/1984  Japan .

*Primary Examiner*—Bentsu Ro
*Attorney, Agent, or Firm*—Staas & Halsey

[57] ABSTRACT

A robot control apparatus according to the present invention includes a limiter, used to limit the operating range of each axis of a robot mechanism. The limiter includes a photo-interrupter where, if a light-interrupting disk, attached to one side of a movable element of the robot mechanism, arrives at a predetermined position and cuts off the luminous flux passing through an optical path provided on the other side of the movable portion then a limiting signal is provided to a control unit. Optical fiber cables couple the photo-interrupter with a light-emitting section and light-receiving section of the control unit, which is installed at a position remote from the robot mechanism.

8 Claims, 3 Drawing Sheets

PHOTOELECTRIC MOTION LIMITING CONTROL APPARATUS FOR A ROBOT MECHANISM

BACKGROUND OF THE INVENTION

This invention relates to a robot control apparatus and, more particularly, to a robot control apparatus having a novel limiter structure for limiting the operating range of each axis constituting a movable portion of a robot mechanism.

An industrial robot grasps a workpiece by means of a hand, or subjects a workpiece to machining, e.g., welding by a tool such as a torch, mounted at a distal end of an arm. In a robot of this type, ordinarily an operating command is issued by a numerical control (NC) unit installed remotely from the robot mechanism, and servomotor power is delivered to the robot mechanism via a magnetics panel, or the like, so that the arm is operated by the servomotor.

Besides a power system cable, a signal system cable is also provided between the robot mechanism and the control unit for transferring such signals as a brake drive signal, signals from various sensors provided on the hand, and signals from limiter switches for limiting the operating range of each axis constituting the robot arm.

In a conventional industrial robot of the above kind, electric signals are used not only for the servomotor power but also for the limiter switch signals of the respective axes; the limiter switches protect the robot. Since the cables usually are arranged close together, an electrical noise component contained in the servomotor power mixes with the limiter switch signals, as a result of which the robot malfunctions. This effect becomes quite pronounced because the power and signal cables are intermingled and packed closely together particularly within the robot arm.

Furthermore, since the limiter switches employ contact switches, the contacts sustain wear and eventually fail to provide smooth on/off action with prolonged switch use. In addition, owing to wear of an operating member, accidents occur in which the limiter switch does not operate even when a dog is actuated.

SUMMARY OF THE INVENTION

An object of the present invention is to provide a highly reliable robot control apparatus which solves the aforementioned problems of the prior art.

According to the present invention, there is provided a robot control apparatus having a limiter structure for limiting an operating range of each axis constituting a movable portion of a robot mechanism, the robot control apparatus being installed at a position remote from the robot mechanism. The robot control apparatus has a photo-interrupter so adapted that, when a light-interrupting disk attached to one side of the movable portion of the robot mechanism arrives at a predetermined position, the light-interrupting disk interrupts a luminous flux passing through an optical path provided on another side of the movable portion. One optical fiber cable is provided for guiding the luminous flux to the photo-interrupter, and a second optical fiber is provided for transferring a limiter signal from the photo-interrupter.

Thus, according to the present invention, an optical fiber cable is employed as the limiter signal cable. As a result, an electrical noise component contained in the servomotor power does not mix in which the signals from the limiter switches and, hence, the robot does not malfunction and the limiter switch signal lines do not pick up foreign noise. In addition, use of the photo-interrupter provides a limiter switch which is contactless.

DETAILED DESCRIPTION OF THE PREFERRED EMBODIMENTS

An embodiment of the present invention will now be described in detail with reference to the drawings.

Figure 1:
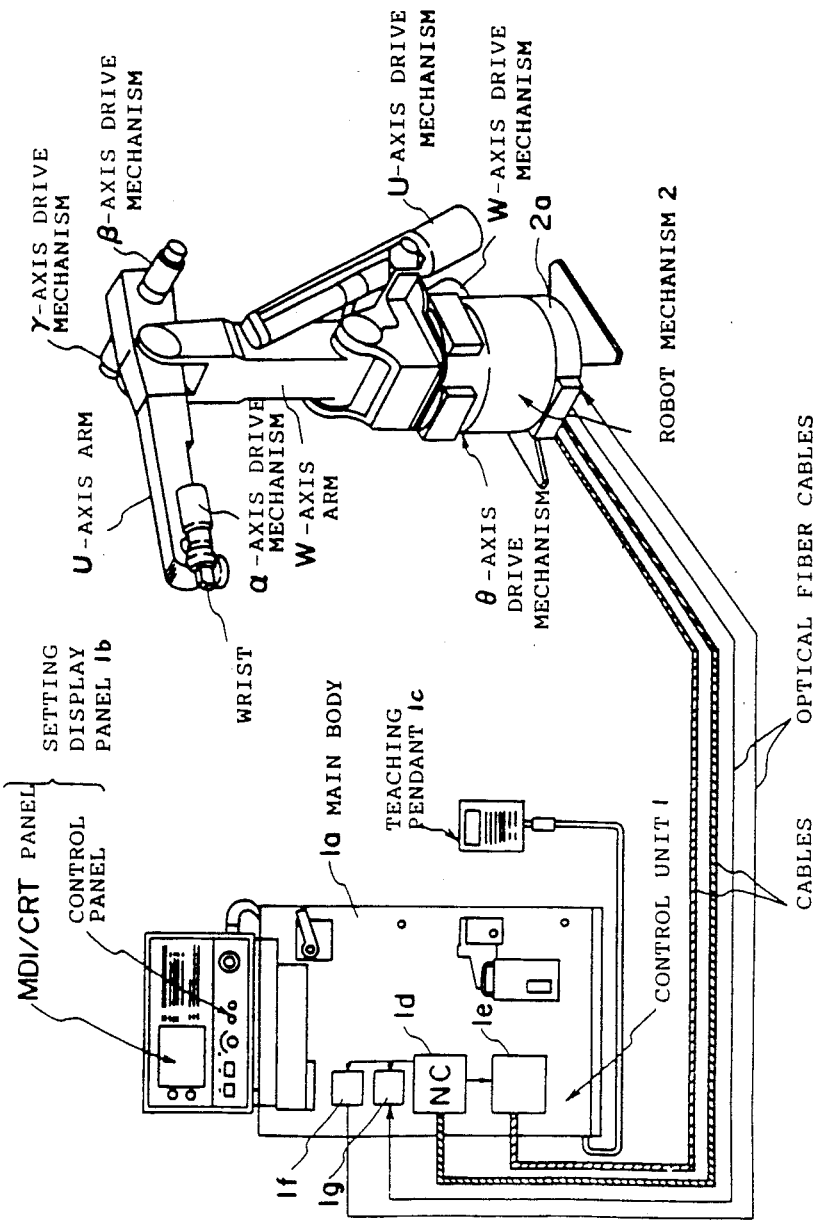
FIG. 1 is a schematic view illustrating an industrial robot which includes a robot control apparatus according to the present invention.

In FIG. 1, numeral 1 denotes a control unit having a main body 1a on the upper portion of which is arranged a setting display panel 1b including an MDI/CRT panel having a manual input and indicator lamps, and a control panel. Provided therebelow is a teaching pendant 1c. Provided within the main body 1a are: a controller 1d including a numeral control (NC) unit; a magnetics panel 1e for motor control, and the like; a light-emitting section 1f for emitting light serving as a limiting signal; and a light-receiving section 1g for receiving the light serving as the limiter signal.

Figure 2:
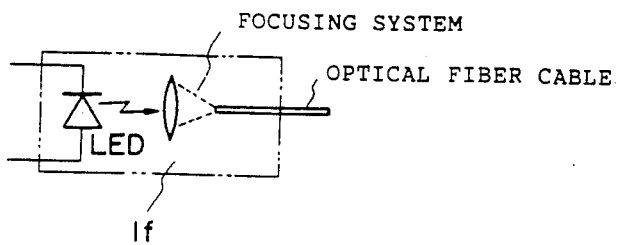
FIG. 2 is a block diagram illustrating an example of a light-emitting section.

As shown in FIG. 2, the light-emitting section 1f includes a light-emitting diode LED and a focusing system for leading the light emitted by the diode into an optical fiber cable. The light-emitting diode LED normally is ON in response to a command from the NC unit.

Figure 3:
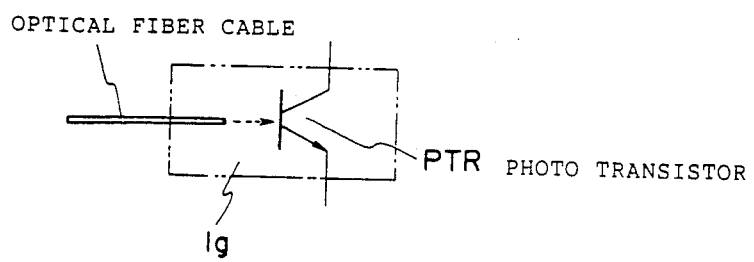
FIG. 3 is a block diagram illustrating an example of a light-receiving section.

As shown in FIG. 3, the light-receiving section 1g includes an optical fiber cable and a photo-transistor PTR. The phototransistor PTR, which is turned on or off depending upon whether light is received from the optical fiber cable, produces an electric signal sent to the controller 1d as a limiter signal. The two optical fiber cables connected to the light-emitting section 1f and light-receiving section 1g lead to a robot mechanism 2.

Again referring to FIG. 1, the robot mechanism 2 has a pedestal 2a secured to, e.g., the floor. Provided on the pedestal 2a are a $\theta$-axis drive mechanism, W-axis drive mechanism, U-axis drive mechanism and $\alpha$-, $\beta$- and $\gamma$-axis drive mechanisms, as well as a U-axis arm, W-axis arm and a wrist driven by the U-axis and W-axis drive mechanisms. All of these are operated in response to commands from the NC unit.

Figure 4:
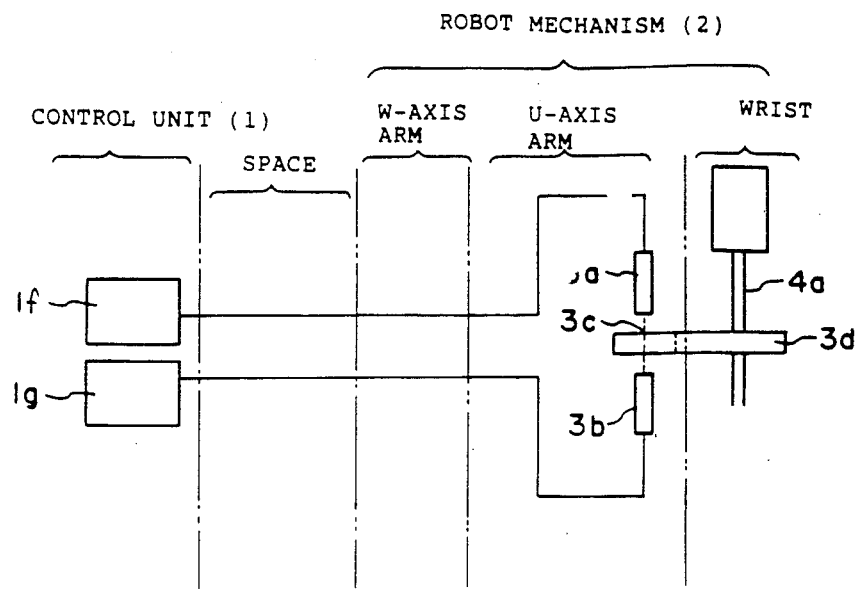
FIG. 4 is a block diagram of an optical signal system illustating an example of a limiter switch mechanism.

As shown in FIG. 4, the optical fiber cables leading to the robot mechanism 2 reach the distal end of the U-axis arm upon being passed through the W-axis arm and U-axis arm. A light projector 3a is attached to the distal end of the optical fiber cable led into the end of the U-axis arm, a light guide 3b is arranged at a position facing the light projector, and a luminous flux 3c emitted by the light projector 3a impinges upon the light guide 3b. This light is lead to the light-receiving section 1g by the optical fiber cable connected to the light guide 3b.

A light-interrupting disk 3d is rotatably provided between the light projector 3a and light guide 3b. The light-interrupting disk 3d has a rotary shaft, which is coupled to a rotary shaft 4a of the wrist, and turns with rotation of the wrist.

Figure 5:
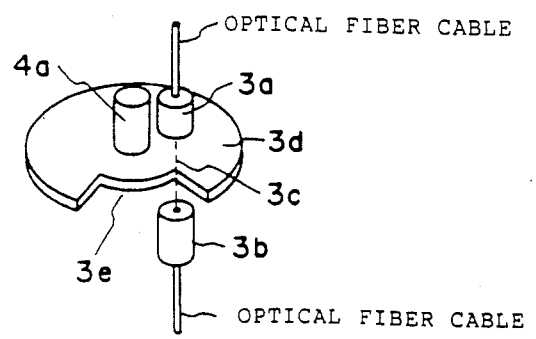
FIG. 5 is a perspective view illustrating the arrangement of a photo-interrupter.

As shown in FIG. 5, the light-interrupting disk 3d is provided with a cut-out 3e. When the luminous flux 3c emitted from the light projector 3a is located at the cut-out 3e, this indicates the safe operating region of the wrist. When the wrist is rotated by an amount so large that the light-interrupting disk 3d cuts off the luminous flux 3c, a signal indicative of this event is sensed immediately by the light-receiving section 1g, which sends a signal to the NC unit 1d. Measures are then taken to stop the rotation of the wrist. It should be noted that the light projector 3a and light guide 3b construct a photo-interrupter together with the light-interrupting disk 3d.

In the above-described embodiment, a limiter switch of a robot control apparatus according to the present invention is provided solely on the rotary shaft of the robot wrist portion. However, the invention is not limited to the foregoing embodiment, for limiter switch mechanisms can be provided on all articulated portions.

In the present invenion as described in detail above, a light-emitting section and a photo-interrupter are coupled by an optical fiber cable, as are the photo-interrupter and a light-receiving section. Even if these cables are arranged close to the power system cable, electrical noise leaking from the power system cable is not picked up by the signal system cables. In addition, the signal system is unaffected even by strong electrical noise arriving from areas other than the robot apparatus. The robot therefore will not malfunction due to such noise.

The movable portion of the robot body is provided with a photo-interrupter in which, when the light-interrupting disk attached to one side of the movable element of the robot mechanism arrives at a predetermined position, the light-interrupting disk cuts off the luminous flux passing through an optical path provided on the other side of the movable portion. Unlike the conventional limiter structure using a limiter switch having contacts, failures due to wear of contacts and operating members are eliminated. Therefore, the present invention has the advantage of improving the reliability of the robot control apparatus.

The robot control apparatus according to the present invention has a novel limiter structure for limiting the operating range of each axis constituting a movable portion of the robot mechanism. Even if the apparatus should be installed at a position remote from the robot mechanism, the influence of noise on the cables can be reliably eliminated to enhance the safety of operation.

The type of robot to which the present invention can be applied is not limited to the articulated kind. The invention can be applied to robots of various types, such as Cartesian coordinate system robots, cylindrical coordinate system robots and polar coordinate system robots.

What we claim is:

1. A limiter structure for a robot control apparatus to limit an operating range of an axis of a robot mechanism movable member having a first portion movable relative to a second portion, comprising:
    means for forming an optical path along the first and second portions;
    means for interrupting the optical path; and
    means for transferring a limiter signal from said interrupting means to said robot control apparatus when the optical path is interrupted.

2. A limiter structure according to claim 1, wherein the interrupting means comprises:
    a light interrupting disc connected to the first movable portion.

3. A limiter structure according to claim 2, wherein the means for forming an optical path comprises:
    a first optical fiber cable for guiding a luminous flux to said disk, and
    a second optical fiber cable for receiving the luminous flux.

4. A limiter structure according to claim 3, wherein the means for forming an optical path further comprises:
    a light emitting section connected to the first cable for providing the luminous flux; and
    a light receiving section for receiving the luminous flux from the second cable, generating an electric signal corresponding to the limiter signal and transmitting the electrical signal to the robot control apparatus.

5. A limiter structure according to claim 4, wherein said interrupting means further comprises:
    a light projector for emitting the luminous flux received via said first optical fiber cable from the light emitting section; and
    a light guide for receiving the luminous flux emitting from said light projector received through the light interrupting disk, and transferring the luminous flux to the light receiving section as said limiter signal.

6. A limiter structure according to claim 5, wherein the light interrupting disk is coupled to a rotary shaft of the first movable portion and is formed to include an angled cut-out portion corresponding to a safe operating range of said movable member.

7. A motion limiting apparatus associated with a robot controller for limiting the operating range of a first portion of a robot relative to a second portion, comprising:
    a rotatable disk, having a cutout portion, attached to the first portion of the robot;
    a light emitting section in the robot controller for producing and focusing light;
    a first optical cable connected to said light emitting section for receiving and carrying the light from said light emitting section;
    a light projector attached to the second portion of the robot in a facing arrangement with said disk and connected to said first optical cable, said light projector projecting the light from said first optical cable toward said disk;
    a light receiver attached to the second portion of the robot in a facing arrangement with said disk opposite said light projector for receiving the projected light from said light projector when the cutout portion of said disk is therebetween;
    a second optical cable connected to said light receiver for transferring the received light from said light receiver; and
    a light receiving section located in the robot controller and connected to said second optical cable, said light receiving section providing a limiter signal to the robot controller when no light is received, the robot controller responding to the limiter signal to stop relative movement betwen the first and second portions of the robot.

8. A motion limiting apparatus according to claim 7, wherein said rotatable disk is coupled to a rotary shaft of the first portion of the robot and the cutout portion corresponds to a safe operating range of the first portion relative to the second portion.

* * * * *